United States Patent [19]
Clitheroe et al.

[11] 4,053,552
[45] Oct. 11, 1977

[54] SOLVENT EXTRACTION OF ZINC FROM SULFITE-BISULFITE SOLUTION

[75] Inventors: Jay B. Clitheroe, Salt Lake City, Utah; Robert Brantley Sudderth, Tucson, Ariz.

[73] Assignees: General Mills Chemicals Co., Tucson, Ariz.; Mineral & Chemical Resource Co., Houston, Tex.

[21] Appl. No.: 666,694

[22] Filed: Mar. 15, 1976

[51] Int. Cl.² .............................................. C01G 9/00
[52] U.S. Cl. .................................... 423/100; 423/109
[58] Field of Search ............... 423/100, 101, 102, 106, 423/109, 512, 512 A; 75/120

[56] References Cited
U.S. PATENT DOCUMENTS

| | | | |
|---|---|---|---|
| 1,154,602 | 9/1915 | Best | 423/106 |
| 1,180,765 | 4/1916 | Durant | 423/106 |
| 1,919,947 | 7/1933 | Johnston | 423/101 |
| 2,992,894 | 7/1961 | Hazen | 423/100 |

*Primary Examiner*—Edward J. Meros
*Assistant Examiner*—Brian E. Hearn

[57] ABSTRACT

Zinc values are leached or converted in a solution containing excess $SO_2$ or $HSO_3^-$ ions, selectively extracted from that solution into an organic phase containing organo acid phosphates and stripped from the organic phase for further processing.

8 Claims, 5 Drawing Figures

SOLVENT EXTRACTION OF ZINC FROM SULFITE-BISULFITE SOLUTION

BACKGROUND OF THE INVENTION a. Field of the Invention

Liquid ion exchange treatment of zinc values.

b. Description of the Prior Art

In presently practiced commercial zinc hydrometallurgy zinc sulfide concentrates containing several associated metals are given an oxidizing roast, thereby producing an $SO_2$ laden gas, which can be sent to a sulfuric acid plant, and a calcine containing zinc values. The calcine is then leached with sulfuric acid. The sulfate solution obtained from leaching carries most of the associated metals along with the zinc and must go through a complicated series of impurity precipitation steps, some involving additives, prior to treatment by electrolysis. The spent electrolyte stream from electrolysis is then returned to the leaching operation and incompletely precipitated impurities and additives that build up in such a sulfate system are troublesome and involve high-cost removal systems.

In liquid ion exchange purification efforts, severe problems are encountered when a precipitate is formed and stays in the system during the solvent extraction (aqueous to organic) step. Precipitates cause emulsification at the aqueous-organic interface, render phase separation less complete, and entail substantial costs for precipitate removal. Co-extraction of other metals with the desired metal also poses substantial problems in the art. Ion exchange systems for purification of zinc from strong acid solutions (for example: sulfate, chloride, nitrate) are pH dependent, and cannot be successfully carried out for concentrated zinc feedstreams without costly neutralizing additives. Various attempts have been made to solve the problems encountered in zinc liquid ion exchange systems. U.S. Pat. Nos. 2,992,894; 3,573,182; and 3,479,378 are examples of attempts to deal with the problems encountered in liquid ion exchange technology for the treatment of zinc.

SUMMARY OF THE INVENTION

The invention is the combination of steps in which zinc values are solubilized in the presence of a solution containing sulfur dioxide or bisulfite ions, after which solvent extraction of the zinc values from the bisulfite solution is carried out with an organo acid phosphate and the zinc values are then stripped from the organic phase into a second aqueous solution for further processing.

The combination of these steps better maintains pH during the extraction step within optimum limits and renders the extractant more highly preferential for zinc to the exclusion of contaminating metals than prior art processes.

BRIEF DESCRIPTION OF THE DRAWINGS

The drawings show the inventor's presently preferred embodiments of a process utilizing the invention. In the drawings.

DESCRIPTION OF THE PREFERRED EMBODIMENT

The inventor's presently preferred embodiment is a hydometallurgical process for recovery and purification of zinc values consisting basically of forming a bisulfite solution of zinc values, solvent extracting the zinc utilizing an organo acid phosphate and stripping the zinc from the organic extractant.

The chemistry of the invention is as follows:

1. $H_2O + SO_2 \rightleftharpoons H_2SO_3 \rightleftharpoons H^+ + HSO_3^-$
2. $ZnX + 2HSO_3^- + 2H^+ \rightleftharpoons H_2X + Zn(HSO_3)_2$
3. 
4. $H_2SO_4 + [R_2Zn] \rightleftharpoons [2HR] + ZnSO_4$ wherein R is the organo acid phosphate radical, X is the anion with which zinc values may be associated in ore or solution feed to the process and the organic phase is shown in brackets.

The inventor's presently preferred organo acid phosphate for use as an extraction solvent in the process is di-2-ethylhexyl phosphoric acid (D2EHPA). Although the family of organo acid phosphates generally has been shown to be effective in solvent extraction when used in connection with this invention, it has been found that D2EHPA has proven to operate best over a wide range of parameters. Those reagents are described as alkyl acid phosphates having a mono- or di-basic acid group and at least one alkyl group which is branched, each branch containing from six to sixteen carbon atoms. Examples of other such reagents are an equi-molar mixture of mono- and di-octyl phenyl phosphoric acid, an aryl acid phosphate, and mono- and di-dodecyl hydrogen phosphate, an alkyl acid phosphate. For the purposes of this description, the term organo acid phosphate shall mean that group of reagents including di-2-ethylhexyl phosphoric acid, mono- and di-octyl phenyl phosphoric acid, and mono- and di-dodecyl hydrogen phosphate.

For the purposes of this description, the terms organic phase, ion exchange reagent, and extraction solvent shall mean that physical phase which contains the organo acid phosphate extractant compound which extracts the zinc values from sulfite solution and yields the extracted zinc values to the mineral acid strip solution. Strip or stripping shall refer to the transfer of zinc values from the organic phase to the aqueous strip solution.

Solvents useful in the invention may be any water-immiscible hydrocarbon into which the organo acid phosphate will dissolve at least to the extent of about 2% by volume.

Chemical equations (1) – (4) describe generally the chemistry of the steps of the invention. In equation (1), aqueous absorption of $SO_2$ and the sulfurous acid dissociation reaction are shown. In the sulfite solution forming or leaching step, ores containing zinc or solutions containing zinc having a sulfate anion are converted to bisulfite solutions by the addition of sulfurous acid or other bisulfite donating compounds. In the case of a solution containing sulfate ions, calcium ions are added to bring about precipitation of the sulfate (not shown). The reaction products of equation (2) yield the zinc ion in a solution containing excess bisulfite ions or a solution saturated with respect to sulfur dioxide. It is believed that zinc bisulfite, $Zn(HSO_3)_2$, is the predominant form of the soluble zinc compound present in the zinc-containing aqueous solution. Equation (3) shows the solvent extraction step, in which the acid form of the organo acid phosphate is contacted with the zinc ion in bisulfite solution, yielding the zinc organo phosphate complex. In equation (4) sulfuric or other strong mineral acid is used to strip the zinc values from the organic phase. This stripping step yields zinc sulfate or other acid form of zinc solution substantially free of contaminating metal ions and converts the organic extraction solvent to its organo acid phosphate form, which is then returned to solvent extraction.

Figure 1:
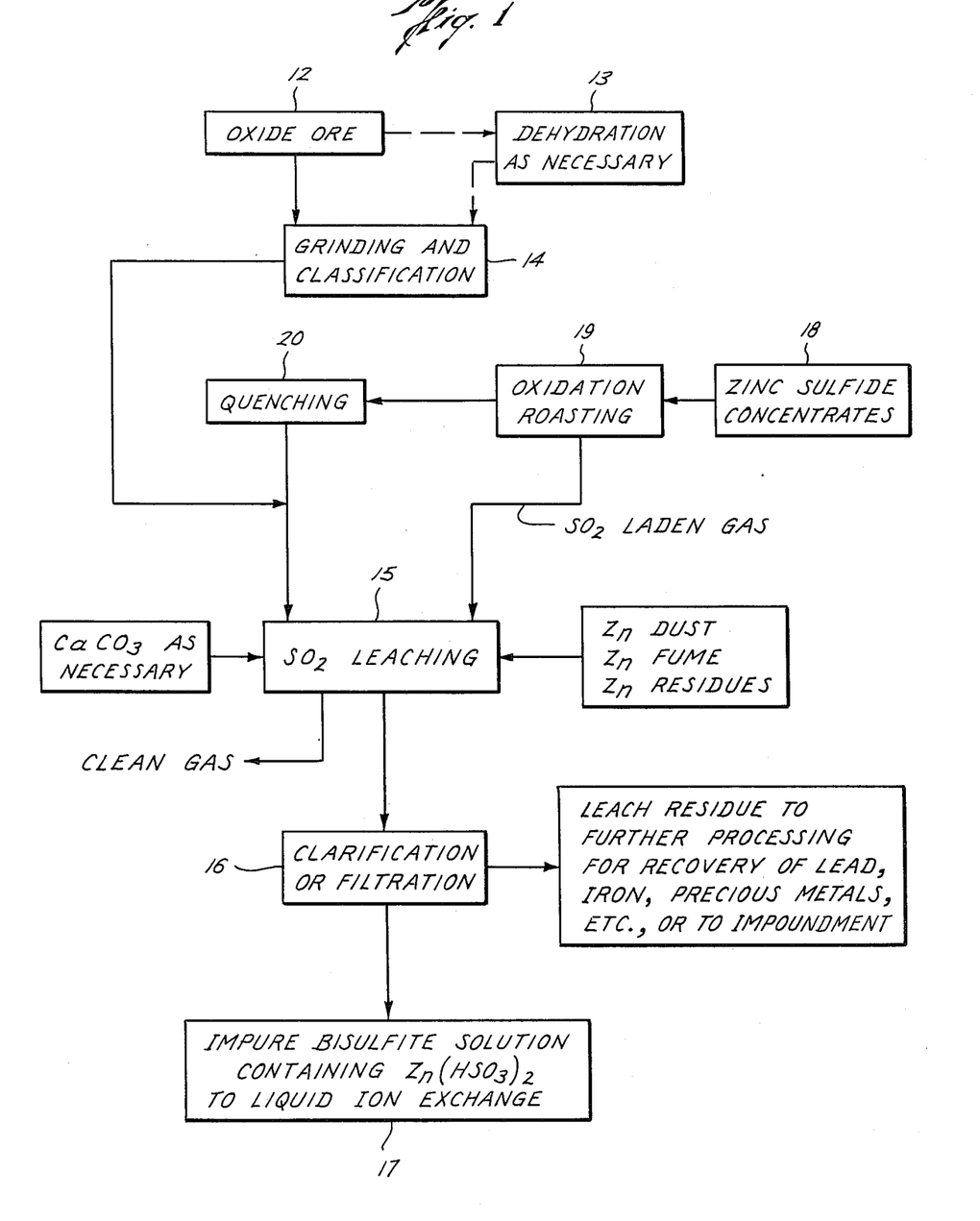
FIG. 1 is a schematic representation of the steps of a process for dissolution of oxide ores, roasted sulfide zinc concentrate calcines, dust, fumes and residues containing zinc values and clarification of the solutions preparatory to solvent extraction.

Referring to the embodiment of the invention shown in FIG. 1, oxide ores 12 may be dehydrated 13 as necessary, sent to grinding and classification 14 and then to an $SO_2$ leaching step. Zinc sulfide concentrates 18 are given an oxidation roast 19, producing a zinc oxide calcine, are quenched 20 and then combined with the oxide ores and sent to an $SO_2$ leaching step 15. The resulting slurry, saturated with respect to sulfur dioxide, is then clarified or filtered 16 and the impure bisulfite solution 17 containing $Zn(HSO_3)_2$ and other metal impurities is then sent to the liquid ion exchange step. A convenient and economic source of $SO_2$ can be the gas emanating from the sulfide roasting step 19.

Figure 2:
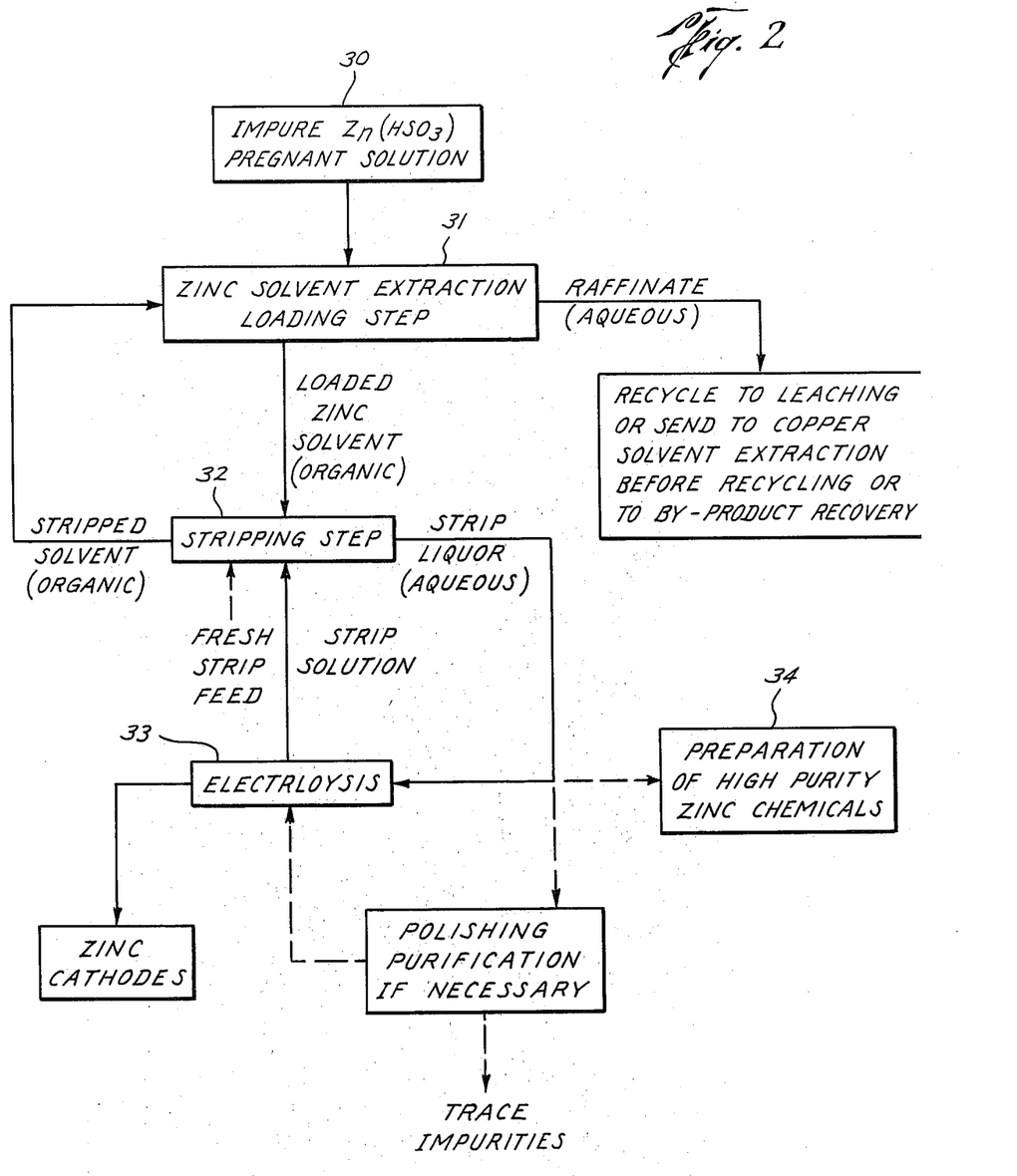
FIG. 2 is a schematic diagram of one embodiment of the invention showing solvent extraction, stripping, electrolysis or other subsequent processing steps, including recycle streams.

Referring to FIG. 2, the impure zinc bisulfite solution, of feed solution 30, is then contacted 31 with an organic phase containing organo acid phosphate and the loaded organic phase is then sent to the stripping step 32 where it is contacted with sulfuric or other strong acid and the zinc values stripped into the aqueous stripping acid phase. The strip solution, containing the stripped zinc values, is then sent to electrolysis wherein zinc is plated out onto zinc cathodes or may be sent to other chemical processing steps 34.

Figure 3:
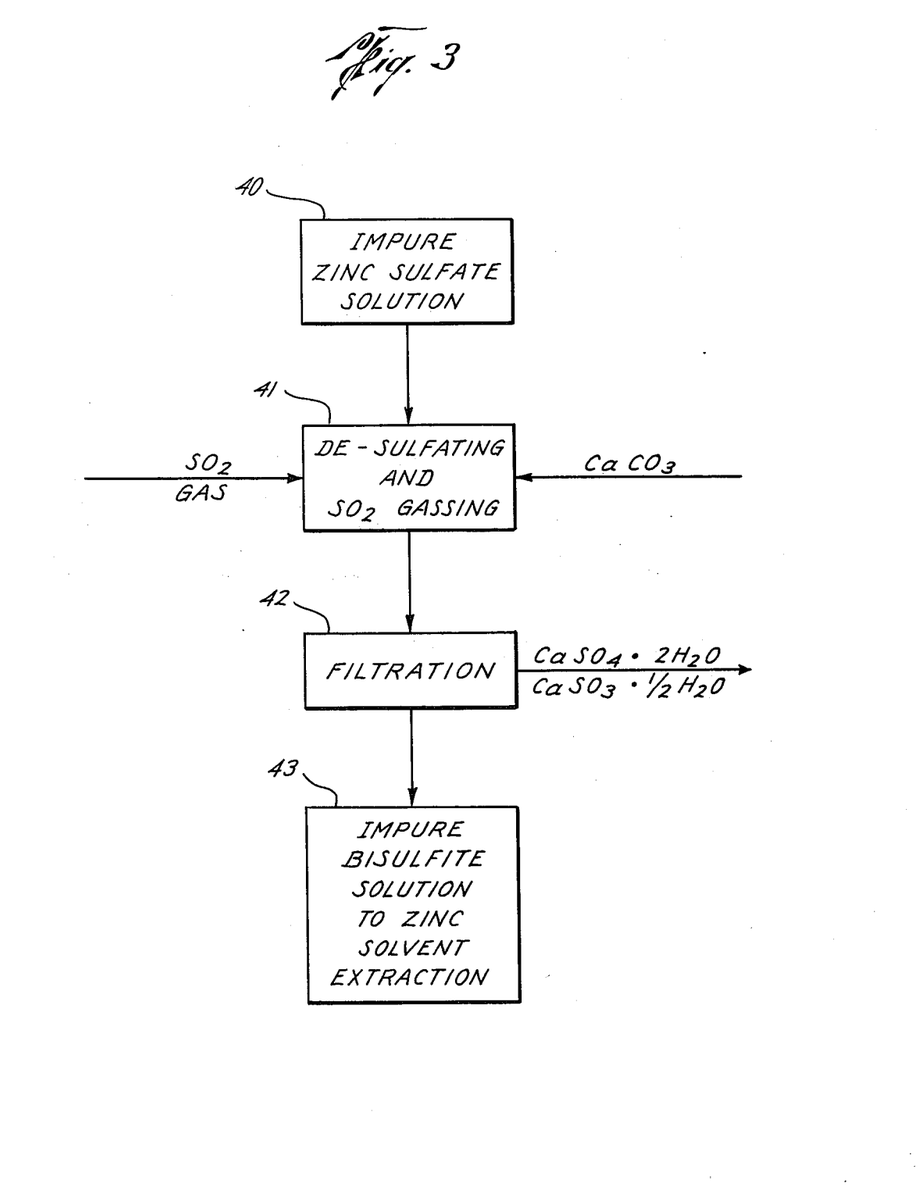
FIG. 3 is a schematic diagram showing one embodiment of the invention taking as a starting material an impure zinc sulfate solution, and showing the desulfating and $SO_2$ addition steps prior to solvent extraction.

FIG. 3 shows one series of process steps for the preparation of the zinc bisulfite solution from an impure zinc sulfate feed 40. Calcium ions and sulfur dioxide are introduced 41 into the impure zinc sulfate solution, the precipitate of calcium sulfate and calcium sulfite are removed from the solution 42, and the resulting impure zinc bisulfite solution 43 is then sent to the solvent extraction step as shown in FIG. 2.

The primary purpose of the leaching step (FIG. 1) or conversion step (FIG. 3) is to produce a solution as high in bisulfite concentration and as low in sulfate concentration as possible. Recognizing that some sulfate can be produced during leaching by such means as oxidation of sulfite to sulfate with excess oxygen in the roaster gas or by dissolution of sulfates that might be produced in the roaster calcine, the desulfating step, or addition of calcium ions, may be utilized in the steps illustrated in FIG. 1 or FIG. 3.

The dehydration step for oxide ores is a relatively low-temperature and short duration "flash roast" to remove combined water from various hydrated minerals, usually silicates and oxides, common to zinc oxide ores. In the case of hemimorphite, a hydrated zinc silicate, and various hydrated aluminosilicate clay minerals, the heat treatment minimizes the production of silica gels during leaching that render liquid-solid separation difficult. In the case of limonitic or hydrated iron oxide, the heat treatment produces artificial hematite and thus minimizes iron dissolution. The flash roast step may be carried out in a conventional rotary kiln at between about 600° F. and about 800° F. for a retention time of 15 to 20 minutes at the dehydration temperature. Residues from a conventional zinc hydrometallurgical plant which contain zinc values and hydrated ferric iron can be similarly treated advantageously prior to $SO_2$ leaching.

Referring to FIG. 2, the aqueous bisulfite solution prepared as above described is contacted with the organic extractants either in a conventional mixer-settler or in a column type contactor such as a sieve plate pulse column or a stirred column. The contactor is preferably modified for completely enclosed operation in order to maintain the $SO_2$ content of the aqueous solution and to reduce exposure of the solution to air oxidation. The loaded organic phase is then stripped in similar equipment employing sulfuric or other strong mineral acids or spent electrolyte as strip solution, thus producing a purified and enriched zinc solution ready for electrolysis or other chemical treatment. The raffinate, or barren aqueous bisulfite solution from the stripping step, can be recycled back to leaching or sent to another metal extraction step as shown. The stripped organic phase is then recycled to the loading step.

The loaded strip solution may alternatively be given a final polishing purification ahead of electrolysis in the event certain trace impurities in concentrations above the very stringent limits demanded for zinc electrolysis have been partially coextracted or entrained. The organic phase loaded with zinc can be stripped with sulfuric or some other mineral acid such as hydrochloric, phosphoric or nitric, thus producing a strip liquor suitable for preparation of high-purity zinc chemicals.

Referring again to FIG. 3, an impure zinc sulfate solution such as a bleed stream from a zinc tank house, a zinc-bearing raffinate from a copper solvent extraction system, or any other zinc-bearing waste system not presently treatable by conventional means can be converted to a bisulfite system. The stream is de-sulfated by adding ground limestone (calcium carbonate) and $SO_2$ to the solution, thus precipitating calcium sulfate along with a minor amount of calcium sulfite. The resulting solution, after filtering away the precipitate, is then a bisulfite solution substantially free of sulfate, ready for treatment by the bisulfite solution extraction process of this invention as illustrated in FIG. 2.

EXAMPLES

Example No. 1

A feed sample of zinc sulfide concentrate from an operating zinc smelter was leached and solvent extracted as described below. The concentrate before treatment assayed as follows:

| Element | % by Wt. |
|---------|----------|
| Zn | 40.68 |
| Cu | 0.616 |
| Pb | 0.107 |
| Mn | 0.448 |
| Fe | 15.33 |
| S | 32.27 |

After an oxidation roast at approximately 1200° F. for a period of time sufficient to eliminate the $SO_2$ odor from the oven off-gases, the resulting calcine was mixed with water and leached by gassing with $SO_2$ to saturation. The leached pulp was then filtered to produce a pregnant bisulfite solution. The solution was then contacted with an organic phase containing D2EHPA.

Figure 5:
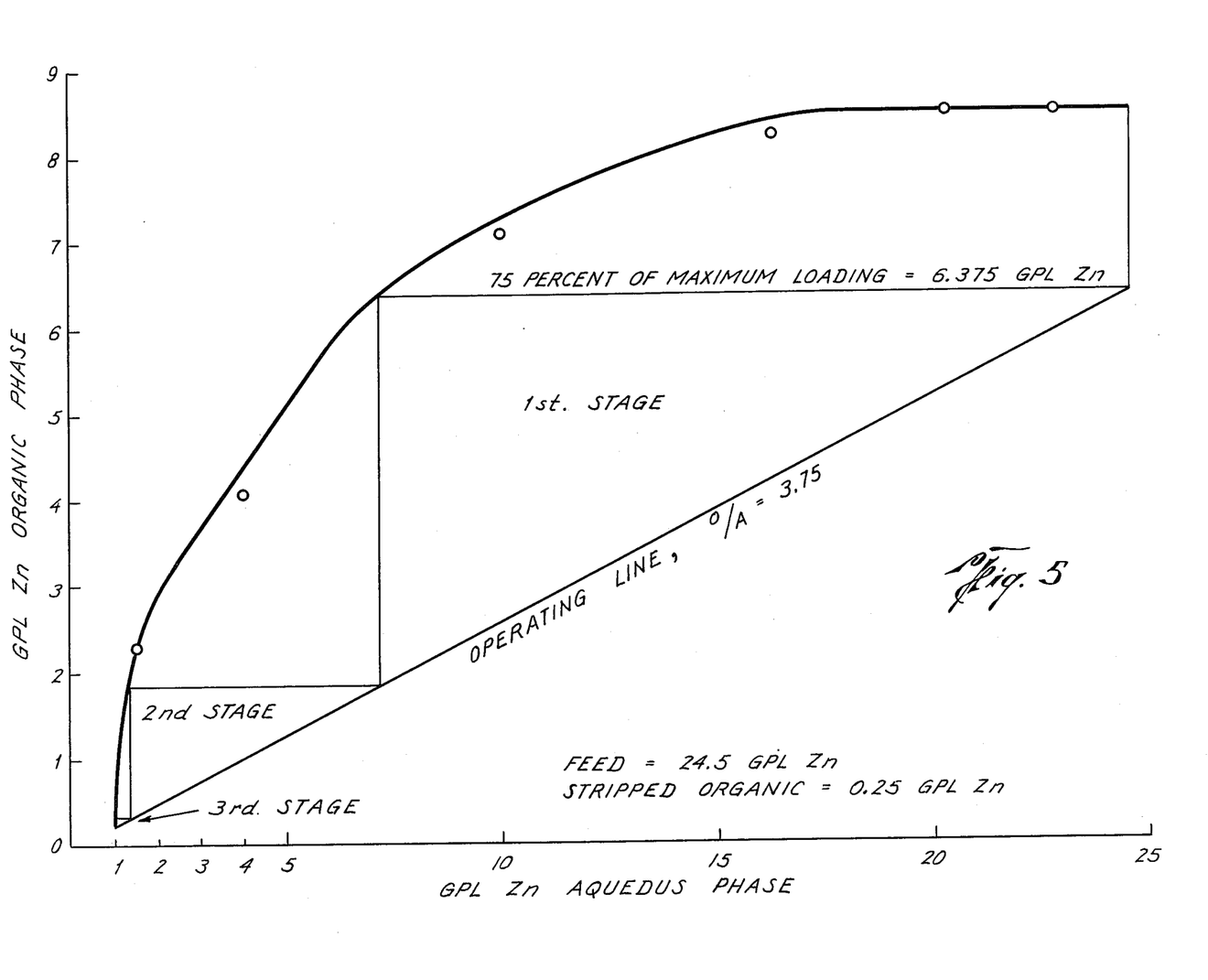
FIG. 5 is a McCabe-Thiele diagram showing an experimentally obtained extraction equilibrium isotherm of the invention utilizing di-2-ethylhexyl phosphoric acid in a sulfite system.

The solvent used in this example was 20 volume percent D2EHPA, 8 volume percent tributyl phosphate and 72 volume percent Napoleum 470B (kerosene). The solvent extraction step was a single stage contact and the organic to aqueous (O/A) ratio was 10:1. The 10:1 O/A ratio is recognized in the art as that representing an acceptable parameter for this operating counter-current solvent extraction circuit consisting of about three stages. Organic to aqueous ratios for both stripping and loading may vary from 100:1 to 1:100, and it has been found expedient in operations to vary the ratio from 10:1 to 1:10. The O/A ratio may vary, as is well known in the art, depending upon the particular organo acid phosphate reagent used, concentration of zinc values in various process streams and the equilibrium which can be obtained in a particular system. The entire solvent extraction process can be carried out continuously with the stripped organic phase being recycled for contacting further quantities of the zinc-containing solutions. FIG. 5 shows the extraction equilibrium isotherm of such a three stage contact system using D2EHPA and shows further that the 10:1 O/A contact point lies at about the third stage in respect to the aqueous assay values.

| RESULTS | |
|---|---|
| Product | Zn Distribution, % of Total |
| Pregnant Bisulfite Solution | 95.97 |
| Leach Residue | 4.03 |
| Roaster Calcine | 100.00 |
| Loaded Organic | 92.02 |
| Raffinate for Recycle | 3.95 |
| Pregnant Bisulfite Solution | 95.97 |

It is to be noted in this example that the loaded organic zinc content actually represents a zinc recovery across extraction from the pregnant leach solution of 95.88%. Copper and iron coextractions in this example were negligible. The pH drop across extraction was from 2.75 to 1.82. The pregnant bisulfite solution contained 19.0 grams per liter zinc and the raffinate contained 1.82 grams per liter zinc.

EXAMPLE NO. 2

A sample of oxide zinc ore from Southern Nevada containing 13.34% zinc was given a laboratory treatment including leaching, solvent extracting and stripping the loaded organic. After a dehydration flash roast at 800° F., a sample was mixed with water and leached by gassing with $SO_2$ to saturation. The leached pulp was filtered to produce a pregnant bisulfite solution. The solution was then single stage contacted with an organic solvent having the same makeup as that employed in Example No. 1, and stripped with an aqueous sulfuric acid solution (95 g/l) at a 10.9:1 O/A ratio. The O/A ratio for the extraction step was 46:1.

| RESULTS | |
|---|---|
| Product | Zn Distribution, % of Total |
| Pregnant Bisulfite Solution | 95.98 |

| RESULTS -continued | |
|---|---|
| Product | Zn Distribution, % of Total |
| Leach Residue | 4.02 |
| Roaster Calcine | 100.00 |
| Strip Solution | 93.10 |
| Raffinate for Recycle | 2.88 |
| Pregnant Bisulfite Solution | 95.98 |

It is to be noted in this example that the pregnant electrolyte zinc content actually represents a zinc recovery across extraction of 97.0 percent. The pH drop across extraction was from 2.3 to 1.7.

Selectivity data showing the trace impurities which were coextracted in this example is as follows:

| Stream | gpl metal | | | | |
|---|---|---|---|---|---|
| | Zn | Cu | Fe | Cd | Ni |
| Pregnant Bisulfite Solution | 21.0 | 0.005 | 0.45 | 0.045 | 0.0053 |
| Strip Solution | 43.0 | 0.0025 | N.D. | 0.005 | 0.0008 |
| Raffinate | 0.47 | — | — | — | — |

EXAMPLE NO. 3

A sample of an impure control bleed stream from an operating zinc refinery tank house was diluted, desulfated and solvent extracted for this example. The sample contained 175 grams per liter (gpl) Zn, 6.71 gpl Mg, and 4.71 gpl Mn., 500 ml. of the feed solution, after diluting 12:1 with plain water, were treated with a slight excess (15 g.) of $CaCO_3$ and simultaneously gassed with $SO_2$ to saturation to accomplish desulfating. The precipitate of $CaSO_4$ was removed and the filtered bisulfite solution was then contacted with an organic solvent having the same makeup as that employed in examples 1 and 2 at the same O/A ratio. Analysis of the extraction products showed the following:

| RESULTS | |
|---|---|
| Product | Zn Distribution, % of Total |
| Loaded Organic | 97.25 |
| Raffinate | 2.75 |
| Pregnant Bisulfite Solution | 100.00 |

The other metals coextracted from the pregnant bisulfate solution in this example were negligible.

EXAMPLE NO. 4

A sample of oxide zinc ore from Mexico was leached and the various operations described below were carried out. The sample was dehydrated at 800° F., leached with $SO_2$ and filtered to produce a pregnant bisulfite solution for use in charting an equilibrium extraction isotherm, selectivity data and extraction and stripping kinetics. The solvent for this data consisted of 10 volume % D2EHPA, 4 vol. % tributyl phosphate and 86 vol. % Chevron Ion Exchange Solvent (kerosene). The O/A ratio of 3.75:1 for the solvent extraction step in this example yielded excellent performance at 75 percent of maximum loading capacity for this feed solution. Similar results could be obtained, for example, at an O/A ratio of 1.875 using the same solvent with 20 V/V% D2EHPA. The results of the equilibrium extraction iostherm are shown in FIG. 5.

A second portion of the pregnant feed solution was given a single contact treatment with the same extraction solvent to produce the following selectivity data:

SELECTIVITY
gpl (or ppm if so indicated)

| Element | Pregnant Bisulfite Solution | Strip Solution (Aqueous) | Loaded Organic |
|---|---|---|---|
| Zn | 24.5 | 66.5 | 6.55 |
| Ca | 5.35 | 0.11 | 0.00008 |
| Cu | 0.13 | 0.003 | 0.00005 |
| Cd | 0.093 | 0.0055 | — |
| Bi | 0.12 | 0.0019 | 0.0057 |
| Pd | 0.0025 | 0.0004 | — |
| Fe | 0.97 | 0.001 | 0.0197 |
| As | 0.69 | 0.001 | |
| Ge | 170 ppm | 28 ppm | |
| $SO_2$ | 36.6 | 4.0 | |
| $SO_4$ | 57.0 | 186.9 | | the pH drop across extraction for this example was from 2.35 to 1.78. Contact time for each case was 2 minutes. The strip feed was 200 gpl $H_2SO_4$. The O/A ratio for this test was 1:1 for extraction and 10:1 for stripping.

A third portion of the pregnant bisulfite solution was solvent extracted as for selectivity data above to yield the following kinetic data:

EXTRACTION KINETICS

| Contact Time (sec.) | gpl zinc (organic) | gpl Fe (organic) |
|---|---|---|
| 15 | 7.0 | 0.0135 |
| 30 | 7.0 | — |
| 60 | 7.0 | — |
| 300 | 7.0 | — |
| 600 | 7.0 | 0.030 |

It can be seen from the extraction kinetics above that zinc extraction is complete in 15 seconds or less. From these results, it is believed that the rate of iron extraction into the organic phase is more time dependent than the rate of zinc extraction.

A fourth portion of the pregnant bisulfite solution was loaded into the organic phase as for selectivity and extraction kinetics and the loaded organic, composed of 10 V/V% D2EHPA, 4 V/V% TBP and 86 V/V% Chevron Ion Exchange Solvent, was stripped at a 1:1 O/A ratio with 34 gpl $H_2SO_4$ to yield the following stripping kinetics:

STRIPPING KINETICS

| Contact Time (secs.) | gpl Zn (organic after stripping) | gpl Fe (organic after stripping) |
|---|---|---|
| 15 | 0.125 | 0.024 |
| 30 | 0.135 | 0.014 |
| 60 | 0.116 | — |
| 300 | 0.120 | — |
| 600 | 0.117 | 0.005 |

The metal content for the loaded organic prior to stripping was 6.7 gpl Zn and 0.03 gpl Fe. It can be seen that the iron strips from the organic phase much more slowly than zinc. Stripping contact time can therefore be utilized to obtain extremely high zinc/iron ratios in the strip solution. It was found from the examples that 15 seconds contact time during stripping is adequate.

EXAMPLE NO. 5

In order to illustrate the striking improvement which this invention represents, two synthetic solutions of approximately the same zinc content and starting pH were contacted in exactly the same manner with D2EHPA. Solution No. 1 was a sulfate solution containing zinc values and Solution No. 2 was a bisulfite solution containing zinc values, and saturated with respect to $SO_2$. The solvent utilized was 20 volume percent D2EHPA, 8 volume percent tributyl phosphate and 72 volume percent Napoleum 470B. The contact was single stage for 3 minutes and the organic to aqueous ratio was 10:1.

RESULTS

| Stream | gpl Zn | pH | Percent Extraction |
|---|---|---|---|
| No. 1 Feed, Sulfate | 22.0 | 2.5 | — |
| No. 1 Raffinate | 11.5 | 1.0 | 48.0 |
| No. 2 Feed, Bisulfite | 21.0 | 2.5 | — |
| No. 2 Raffinate | 0.8 | 1.6 | 96.2 |

It is to be noted from the results of this example that the pH drop was 1.5 units and the extraction 48.0 percent in the case of a sulfate solution, whereas the pH drop was 0.9 units and the extraction 96.2 percent in the case of the bisulfite solution. An organic phase consisting of D2EHPA and kerosene only will yield an almost identical result under the same conditions.

EXAMPLE NO. 6

A solution saturated with respect to $SO_2$ and containing approximately 20 gpl zinc was contacted at a 1:1 O/A ratio with a mono- and di-octylphenyl acid phosphate mixture obtained from Mobil Chemical Company, denominated as lot number 0518001. The organic phase containing the organo acid phosphate was diluted with kerosene to 10 volume percent with kerosene and extracted, yielding the following extraction at the listed pH levels:

RESULTS

| pH | gpl zinc extracted |
|---|---|
| 1.1 | 6.4 |
| 1.5 | 7.6 |
| 2.0 | 9.2 |
| 2.5 | 10.1 |

It is believed, though not stated as a limitation, that the superiority of processes utilizing the present invention accrues as a result of the higher ending pH of the extraction step obtained from $SO_2$ saturation, which contributes to the extremely high extraction achieved. The solubility of sulfur dioxide in certain organic solvents is shown in the following table:

| Organic | Solubility, gpl $SO_2$ |
|---|---|
| (a) Napoleum 470B | 65.9 |
| (b) $D_2$EHPA (71.4 V/V%) + TBP (28.6 V/V%) | 120.0 |
| (c) 10 V/V% of (b) in (a) | 30.4 |

Various organic solvents possessing the ability to absorb substantially amounts of $SO_2$ may be used in connection with the organo acid phosphates of the present invention in place of the tributyl phosphate and Napoleum 470B, as well known in the art.

Figure 4:
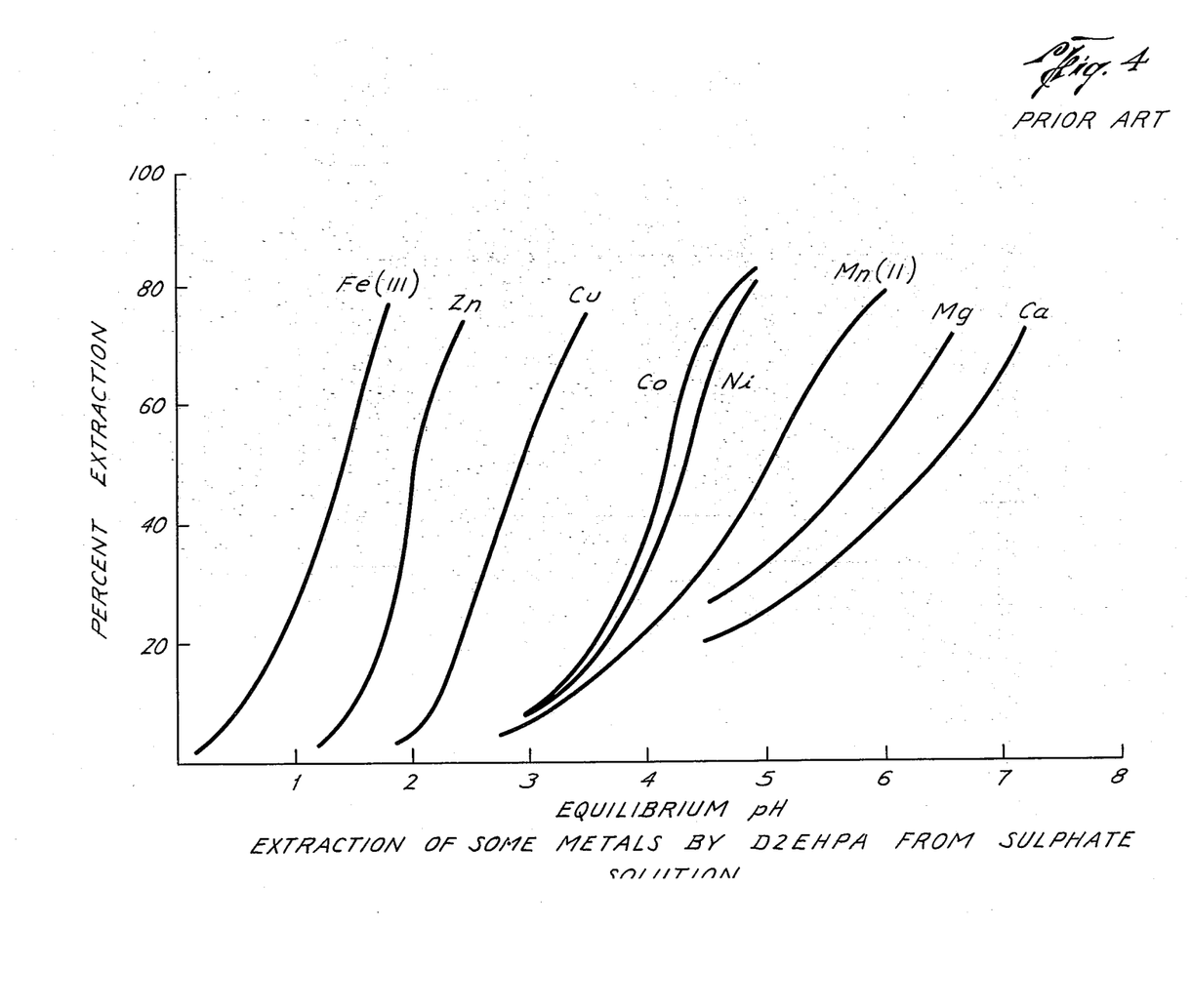
FIG. 4 is a chart showing prior art pH-extraction isotherms of various metals at various equilibrium pH using di-2-ethylhexyl phosphoric acid as the liquid ion exchange reagent in sulfate systems.

Another advantage offered by the bisulfite system is the selectivity of zinc extraction with respect to iron. Referring to FIG. 4, the ferric iron was coextracted with zinc according to the prior art and, for some parameters, was preferentially extracted over zinc. Ferrous iron, however, is only slightly extracted and in this system all ferric iron is reduced by $SO_2$ to the ferrous state. An additional curve representing a pH-extraction isotherm of ferrous iron by D2EHPA would be shown as a generally horizontal line across the lower pH range of the chart at a very low level.

The zinc concentration in the electrolyte (strip solution) that can be achieved in this invention is limited only by practical considerations of the art such as allowable free acid content of strip solution, allowable zinc in the organic recycled to extraction, and amount of zinc in the pregnant bisulfite feed solution. A sulfuric acid strip solution having 50 gpl free $H_2SO_4$ and containing 198.0 gpl zinc was actually produced during one test. That zinc concentration is in the range of supersaturation for such a solution.

Zinc concentration in the bisulfite feed to solvent extraction can contain from trace amounts to about 50 gpl but preferably should be in the range of 20–30 gpl for optimum extraction efficiency. Although all examples were carried out at ambient temperature, the temperature range during solvent extraction can range from ambient to 160° F. In processes utilizing roaster gas for leaching, the most convenient temperature is in the range of 120° F. to 140° F., which represents the adiabatic water saturation temperature typical of roaster gas chilling. It has been found that temperatures elevated above ambient are beneficial both to leaching kinetics and to improved phase separation and permits a higher D2EHPA concentration in kerosene.

The pH range during extraction in this system can be between about 4.5 and about 1.5 but preferably is about 3.0 to about 2.0. A satisfactory number of contact stages for loading and stripping was shown in FIG. 5 to be 2 to 3 for mixer-settler type contacting. Such a series of contact steps would be equivalent to about 4 to 6 stages in a column type contactor, assuming 50% stage efficiency.

Thus, it can be seen that a highly efficient method for beneficiating zinc values for electrolysis has been shown. Further modifications and alternatives embodiment of the method of this invention will be apparent to those skilled in the art in view of this description. Accordingly, this description is to be construed as illustrative only and as for the purpose of teaching those skilled in the art the manner of carrying out the invention. It is to be understood that the forms of the invention herewith shown and described are to be taken as the presently preferred embodiments. Various change may be made in the compositions, arrangements of steps and parameters disclosed herein. For example, equivalent sequences of steps or materials may be substituted for those illustrated and described, and certain features of the invention may be utilized independently of the other features, all as would be apparent to one skilled in the art after having had the benefit of this description of the invention.

What is claimed is:

1. In a process for hydrometallurgical purification of zinc, the steps consisting essentially of:
   forming an aqueous feed solution containing zinc values and a concentration of available bisulfite ions stoichiometrically in excess of the concentration of all metal values in said feed solution;
   contacting said aqueous feed solution with an organic phase containing an ion exchange reagent selected from the group consisting of organo acid phosphates at a pH of from about 4.5 to about 1.5, whereby the pH of said contacting step is maintained throughout extraction within said pH range and at least a portion of said zinc values are extracted into said organic phase;
   and, contacting said organic phase with an inorganic mineral acid strip solution, thereby stripping said zinc values from said organic stage into said strip solution.

2. The process as claimed in claim 1, wherein said first forming step includes the steps of:
   adding to said feed solution a material selected from the group consisting of the oxides, hydroxides, carbonates, sulfites, bicarbonates and bisulfites of calcium prior to said contacting step in an amount stoichiometrically in excess of the sulfate ion concentration of said feed solution;
   and, separating solids from said aqueous solution prior to said contacting step.

3. The process as claimed in claim 1, including the additional step of:
   separating said feed solution from said organic phase,
   and, repeating said first contacting step on the once-contacted feed solution containing unextracted zinc values with a second organic phase containing said ion exchange material.

4. The process as claimed in claim 1, wherein said forming step includes the step of:
   leaching a material containing zinc values with an aqueous leachant containing sulfur dioxide.

5. The process as claimed in claim 4, wherein:
   said zinc-containing material is subjected to a roasting step prior to said leaching step.

6. The process as claimed in claim 1 wherein:
   said ion exchange reagent is di-2-ethylhexyl phosphoric acid.

7. In a process of hydrometallurgical recovery of zinc, the steps consisting essentially of:
   removing substantially all sulfate ions from an aqueous feed solution containing leached zinc values by adding to said solution calcium ions in an amount stoichiometrically in excess of the concentration of said sulfate ions and sulfur dioxide in an amount stoichiometrically in excess of the total metal cation concentration in said solution;
   contacting said feed solution with an organic phase containing an ion exchange material selected from the group consisting of organo acid phosphates at a pH of from about 4.5 to about 1.5, whereby the pH of said contacting step is maintained throughout extraction within said pH range and at least a portion of said zinc values are extracted into said organic phase;

8. The process as claimed in claim 7, wherein:
   said ion exchange material is di-2-ethylhexyl phosphoric acid.

* * * * *

UNITED STATES PATENT AND TRADEMARK OFFICE
CERTIFICATE OF CORRECTION

PATENT NO. : 4,053,552
DATED : October 11, 1977
INVENTOR(S) : Jay B. Clitheroe and Robert Brantley Sudderth It is certified that error appears in the above-identified patent and that said Letters Patent are hereby corrected as shown below:

In the drawings, Sheet 2, Fig. 2, the legend in block 31 "ZINC SOLVENT EXTRACTION LOADING STEP" should read --ZINC ION EXCHANGE EXTRACTION LOADING STEP--; the legend on the arrow from block 31 to block 32 "LOADED ZINC SOLVENT (ORGANIC)" should read --LOADED ZINC EXTRACTANT (ORGANIC)--; the legend on the arrow from block 32 to block 31 "STRIPPED SOLVENT (ORGANIC)" should read --STRIPPED EXTRACTANT (ORGANIC)--. In Sheet 3, Fig. 3, the legend in block 43 "IMPURE BISULFATE SOLUTION TO ZINC SOLVENT EXTRACTION" should read --IMPURE BISULFATE SOLUTION TO ZINC ION EXCHANGE EXTRACTION--. Column 1, line 1, "SOLVENT" should read --ION EXCHANGE--. Column 3, line 38, "of" should read --or--. Column 4, line 43, "zine-bearing" should read --zinc-bearing--; line 52, "solution" should read --solvent--. Column 7, line 19, "the" should read --The--. Column 8, line 59, "substantially" should read --substantial--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks